United States Patent [19]

Cucchi et al.

[11] Patent Number: 4,627,779

[45] Date of Patent: Dec. 9, 1986

[54] DEVICE FOR WITHDRAWING AND UNLOADING CROP-ENDS OF METAL BARS FROM A BAR PUSHER

[75] Inventors: Giovanni Cucchi; Pietro Cucchi, both of Bussero, Italy

[73] Assignee: F.LLI Cucchi S.r.l., Milan, Italy

[21] Appl. No.: 734,071

[22] Filed: May 15, 1985

[30] Foreign Application Priority Data

May 31, 1984 [IT] Italy .............................. 21190 A/84

[51] Int. Cl.$^4$ ............................................. B23Q 5/22
[52] U.S. Cl. ...................................... 414/17; 294/116; 294/88; 414/226; 414/753
[58] Field of Search ................. 414/17, 226, 753, 729, 414/739, 745; 901/32, 37; 294/106, 116, 88

[56] References Cited

U.S. PATENT DOCUMENTS

| | | | |
|---|---|---|---|
| 3,545,804 | 12/1970 | Richner | 294/116 |
| 4,343,590 | 8/1982 | D'Aloisio | 414/226 X |
| 4,352,615 | 10/1982 | Neukomm | 414/17 |
| 4,463,635 | 8/1984 | Hafla et al. | 294/116 X |

Primary Examiner—Robert J. Spar
Assistant Examiner—D. Glenn Dayoan
Attorney, Agent, or Firm—Shlesinger, Fitzsimmons & Shlesinger

[57] ABSTRACT

A device for withdrawing from a bar pusher and thereafter unloading the crop-ends of metal bars in a bar feeding apparatus for a multi-spindle lathe, the device being suitable also for placing a new bar on the bar pusher, is disclosed; the device of the invention is comprised essentially of a pair of movable jaws which by a turning movement close onto the crop-end of a metal bar and lock the crop-end therebetween; the crop-end is the residual part of the lathe machining of the metal bar; thereafter the jaws accomplish a translation movement to detach the crop-end from a bar pusher which formerly caused the bar forwarding in the feeding apparatus of the lathe; the jaws thereafter open slowly dropping the crop-end in a proper unloading zone; finally the jaws close onto a new metal bar to be machined and, by a further translation movement in the direction opposite to the former one, perform the insertion of the new metal bar end into the bar pusher.

14 Claims, 13 Drawing Figures

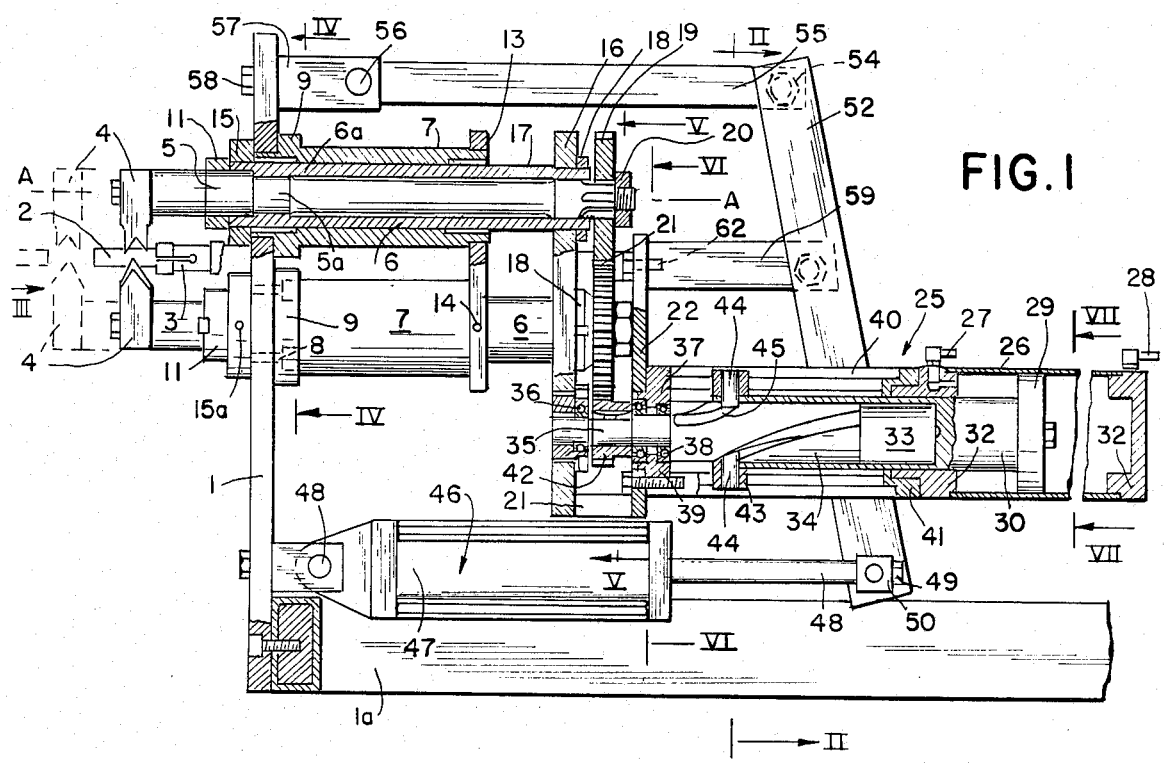
FIG. 1
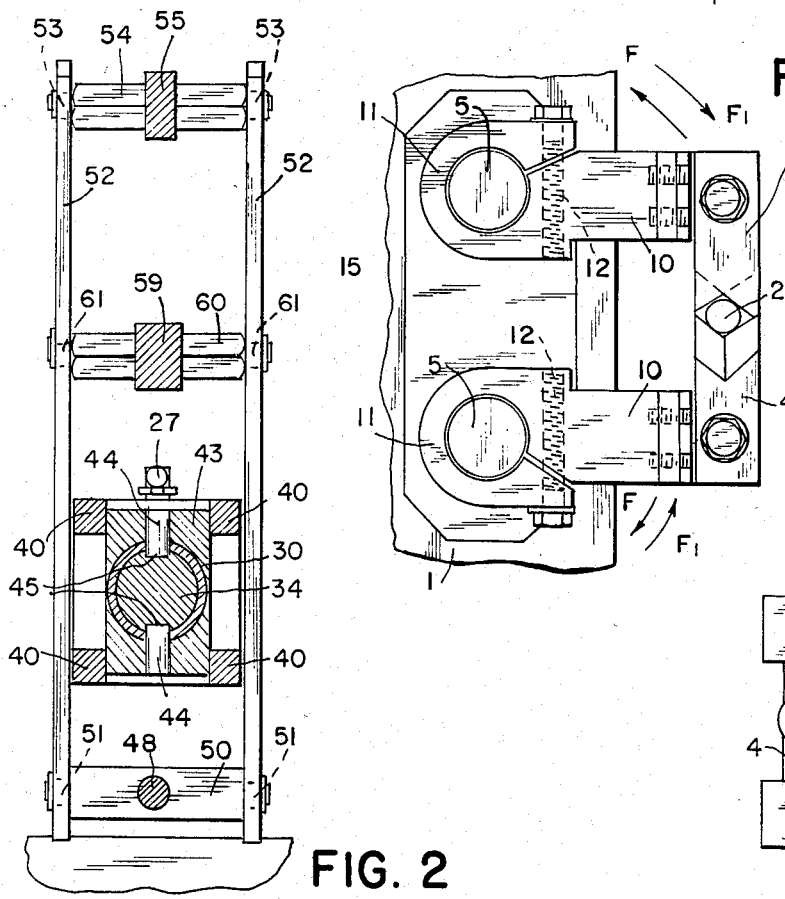
FIG. 2
FIG. 3
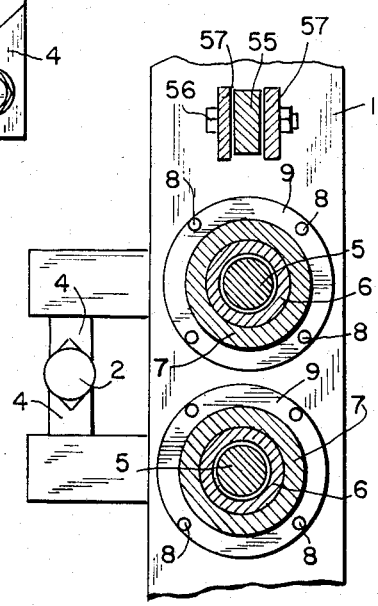
FIG. 4

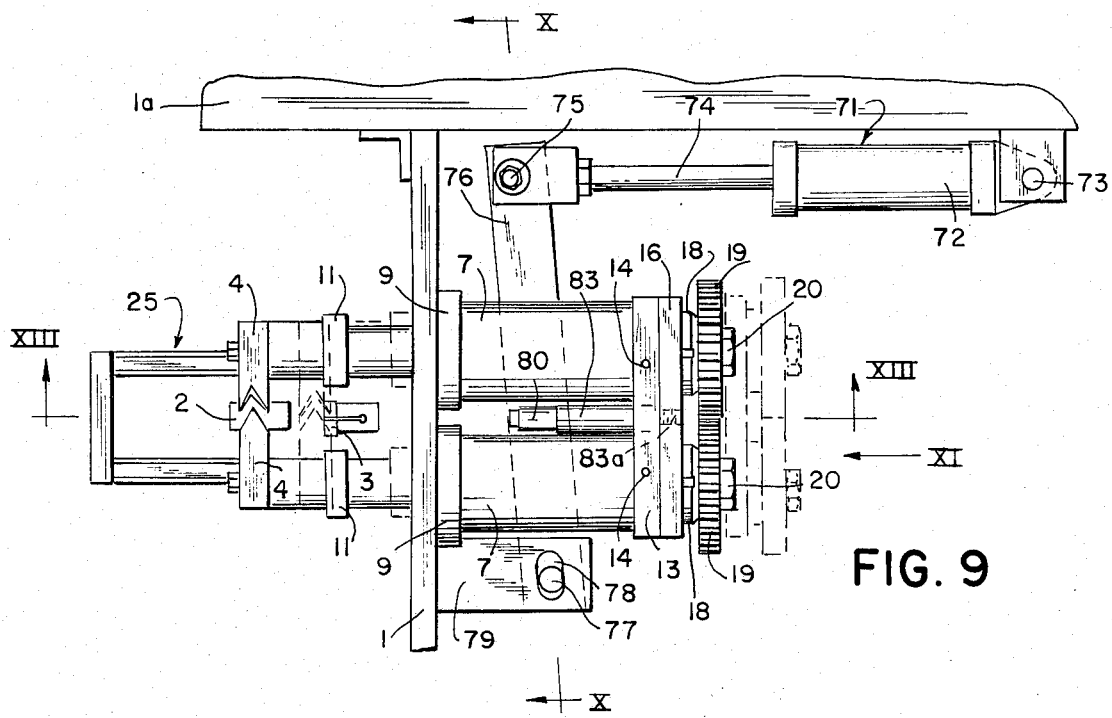
FIG. 9
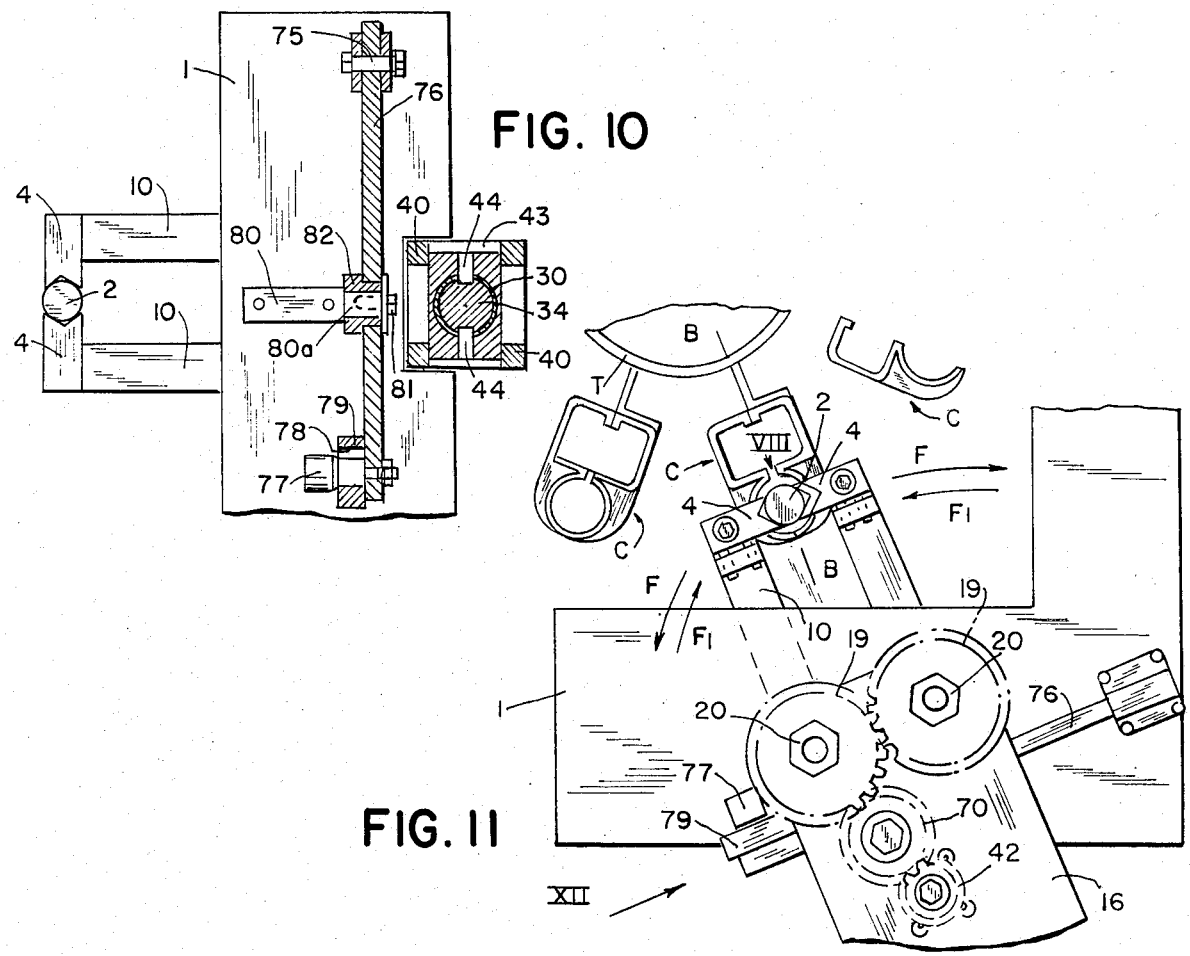
FIG. 10
FIG. 11

DEVICE FOR WITHDRAWING AND UNLOADING CROP-ENDS OF METAL BARS FROM A BAR PUSHER

This invention relates to a device for performing, in a metal bar feeding apparatus for a multi-spindle lathe, the withdrawing and unloading operations of the crop-end which remain after completion of the lathe machining of the metal bars. After the unloading operation of the residual crop-end, the device performs the insertion of a new bar on the same bar pusher from which the crop-end has been removed.

More particularly, the present invention relates to a device for the type disclosed in our Italian patent application No. 23472 A/82 filed on Sept. 28, 1982, in the name of the same Applicant.

It is known that a metal bar feeding apparatus for a multi-spindle lathe is comprised of a plurality of guide channels placed coaxially with the lathe spindles, inside at least one of said channels there being bar pusher drivingly movable by suitable drive means, said bar pusher causing feeding of the metal bar in a sequence of preset lengths as the bar is driven to the various machining stations of the lathe. The rear end of the bar is transitorily joint to the bar pusher by a coupling which is substantially a clutch coupling, and on completion of the bar machining said rear end, which has a certain length, forms the crop-end remaining after machining. The bar pusher, which up to this stage of the operation sequence has been forwarded along the guide channel, is now caused to move backward to the crop-end unloading zone, and such operation is performed by the inventive device, to be described fully later.

The known device which is disclosed in the above Italian patent specification to which reference is made, notwithstanding its reliable operation, has a noticeable drawback, as it is exceedingly large, both in the longitudinal and in the transversal directions in respect of the feeding direction of the metal bars. In fact the rotation of the jaws of said known device to grasp and drop the crop-ends of the metal bars is obtained by means of a transverse drive rod acting eccentrically on one gear of a gear pair keyed to the shaft respectively supporting said jaws. Taking additionally into account that said drive rod is comprised of the piston rod of an actuating cylinder, it is easier understood that the transverse dimension of said means is remarkable and entails problems in the installation of the device. In pratice, the whole size of the device causes an ensuing and remarkable increase of the size of the metal bar feeding apparatus.

In fact, the dimensions of the transverse bar controlling the rotation of the jaws, which is a fixed dimension because imposed by the required stroke of said piston rod, bind and determine the dimensions of the machine frame. For example, by diminishing the diameter of the drum which supports the guide channels for the metal bars, the device for drawing and unloading the crop-ends is shifted towards the center of said drum to adjust the position of the jaw ends according to the new position of the guide channels. The ensuing displacement of the transverse drive rod, the dimensions of which cannot be changed, is such that it causes an increase of dimensions for the machine frame which supports the drum of the guide channels. The frame dimensions will be therefore much larger than necessary for containing the usual actuating devices, and as a result the machine will have remarkable size.

The above drawback results emphasized particularly with equipments for handling bars of large diameter, which equipments therefore must have said piston actuating the transverse drive rod with suitably large dimensions.

It has been now conceived, and it is the object of the present invention, a device of the above type which permits to eliminate the drawbacks of the known device.

The features and the advantages of the device of the present invention will become clearly apparent from the following detailed description of two preferred embodiments, taken in conjunction with the accompanying drawings, in which:

FIG. 1 is a longitudinal cross-sectional view of a first embodiment of the device according to the invention;

FIG. 2 is a sectional view of said embodiment taken along the line II—II of FIG. 1;

FIG. 3 is a view of the device of FIG. 1 in the direction of arrow III of FIG. 1;

FIG. 4 is a sectional view taken along the line IV—IV of FIG. 1 of the device according to the invention;

FIG. 9 is a view similar to FIG. 8 but partially in section;

FIG. 10 is a sectional view of said second embodiment taken along the line X—X of FIG. 9;

FIG. 11 is a view of the device in the direction of arrow XI of FIG. 9;

Figure 5:
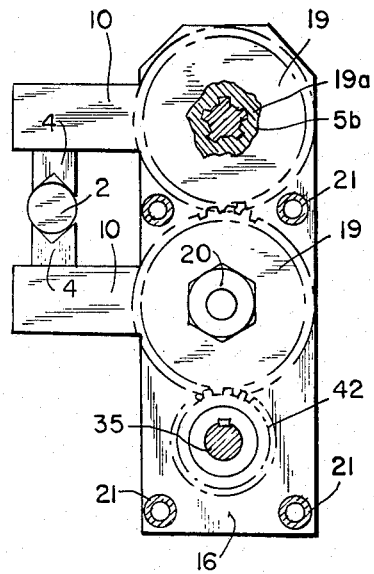
FIG. 5 is a sectional view of the device taken along the line V—V of FIG. 1.

With reference to FIGS. 1 to 7 to describe the first embodiment of the device according to the invention, the reference numeral 1 designates the stationary frame of the machine for feeding metal bars to a multi-spindle lathe, the device of the invention being applied to said machine.

The reference numeral 1a designates schematically one of the longitudinal members which support the stationary frame 1. The reference numeral 2 designates a crop-end of a metal bar which is the residual part of the bar after lathe machining of the latter. Crop-end 2 is transitorily locked at one end thereof within the collet-shaped end 3 of a bar pusher of a known type which is not further illustrated. The end 3 of the bar pusher is shaped so as to join with the crop-end 2 by a coupling which is substantially a clutch coupling. The crop-end 2 was originally the rear end of the metal bar.

The object of the device according to the invention is to grasp the crop-end 2, to let it get out the collet 3 of the bar pusher by means of a leftward movement as seen in FIG. 1, and then to drop it by gravity in the unloading zone. A further task of the device according to the invention is to grasp the rear end of a new bar to be machined and, by a movement in the direction opposite to the former direction, to provide the clutch insertion of said end in the collet-shaped end 3 of the bar pusher.

To this end the device according to the invention is provided with a pair of movable jaws 4, the opposed ends thereof being shaped as disclosed in the Italian patent application No. 23472 A/82 filed on Sept. 28, 1982. By means of said opposed ends the jaws 4 close and grasp either the crop-end 2 or the rear end of the new metal bar. Jaws 4 are carried by carrier means suitable for moving said jaws to fulfil the above task.

Jaws 4 are fixed to one end of support shafts 5, only one of which is illustrated in FIG. 1 since its support means are shown in longitudinal sectional view. Said shaft 5 shown in that shaft which in FIG. 1 is located in the uppermost position; the other shaft 5 is to be considered of similar structure.

Each support shaft 5 is rotatable within a sleeve-shaped member 6 which, although not rotatable relative to the stationary frame 1, can slide along the direction A—A of FIG. 1 within a support member 7 which, as particularly clear from FIG. 4, is fixed to frame 1 by means of lock screws 8 which are screwed in said frame passing through an end peripheral flange 9 of the support member 7.

Locking of jaws 4 provided on the end portions of shafts 5 is shown in more detail in FIG. 3. As shown in the figure, the jaws 4 are supported by and attached to the ends of support brackets 10, the opposite ends of which are shaped generally as a clamp embracing the end of the shaft 5 and closed thereupon by means of a lock screw 12.

The support members 7, comprised generally of sleeves which include internally the sliding sleeve members 6, are fixed in the manner described above to one end of the stationary frame 1 and at the other end are connected one another by a flange 13 attached to said other ends of the support members 7 and fastened thereto by lock screws 14. This connection is provided in order to maintain at a constant value the center distance between the shafts 5.

A further flange 15, parallel to the stationary frame 1 and placed on the side of jaws 4, is fastened to the ends of the sleeve members 6 by means of lock screws 15a. This connection is provided in order to maintain at a constant value the center distance between the sleeve members 6, and therefore the center distance between shafts 5.

The other ends of the sleeve members 6 are connected one another by means of a flange 16 which is stopped against a shoulder 17 of the sleeve members 6 by means of stop nuts 18.

As described above, the sleeve members 6 are movable inside the support members 7 to and fro in the direction A—A. Shafts 5 are locked to sleeve members 6 during said translation movements, because an internal step protrusion 6a of the sleeve members 6 engages a mating recess 5a of the shafts 5; said shafts can therefore turn inside the sleeve members 6, but cannot slide therein.

The shafts 5, at the side of the flange 16, protrude externally of the sleeve members 6, and on each shaft 5 there is keyed by any known means a gear 19 permanently meshing with a gear 19 keyed on the other shaft 5, as it is illustrated particularly in FIGS. 1 and 5. In the embodiment shown as an example, the keying of gears 19 on the shafts 5 is provided in known manner by protrusions 19a on the gear 19 which engage with mating recesses 5b on the shaft 5, as particularly illustrated for the gear 19 shown sectioned in FIGS. 1 and 5.

Gears 19 are maintained in their respective positions on the ends of shafts 5 by means of nuts 20 screwed on the threaded end of shaft 5.

Figure 6:
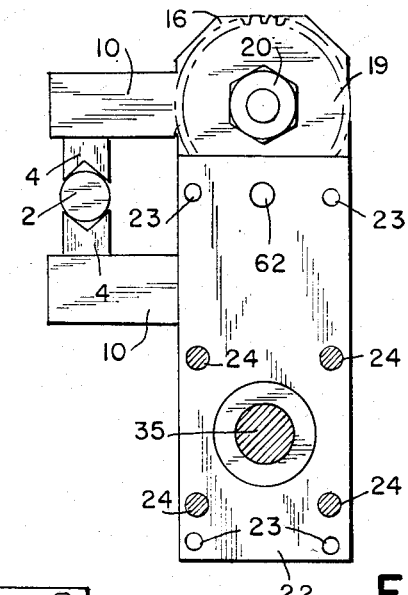
FIG. 6 is a sectional view of the device taken along the line VI—VI of FIG. 1.
Figure 7:
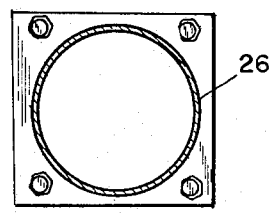
FIG. 7 is a sectional view of the device taken along the line VII—VII of FIG. 1.

The flange 16, as shown particularly in FIGS. 1, 5 and 6, is fixed by means of spacers 21 to a further flange 22 and said two flanges together permit supporting a drive movement of means provided in order to cause the jaws 4 to rotate. Spacers 21 are four in number (FIG. 5) and each is comprised of a central body of generally cylindrical shape with both ends threaded for insertion and locking by screwing on the flange 16 and flange 22, respectively. In FIG. 6 there is shown the ends 23 of the spacers 21 which are at the side of flange 22.

A control piston, generally designated by the reference numeral 25, is tied to the flange 22 by means of four lock screws 24 and permits to obtain the rotaary movement of the jaws 4.

The control piston 25 is comprised of a cylindrical body 26 connected by known means not shown to a pressure fluid source, for example a compressed air source, by means of a first and a second conduit 27 and 28 respectively which permit to let air in the cylindrical body 26 on either side of the head 29 of a piston 30 in order to obtain the to and fro movement of the latter, leftwards and rightwards with reference to FIG. 1.

Piston 30 is slidingly movable within an annular sealing member 21 which, together with another sealing member 32, closes the cylindrical body 26 at both ends.

Piston 30 is provided with a longitudinal cavity 33 which extends mainly in that portion of piston 30 which is designed to protrude from the cylindrical body 26. Inside the cavity 33 there is placed a cylindrical shaft 34 which is supported on its portion 35 having a reduced diameter by the flange 16 through a bearing 36 and by the flange 22 through a bearing 37. Further, a thrust bearing 38, placed between the portion 35 of the shaft 34 and a support plate 39 attached to the flange 22, permits the shaft 34 to be supported and rotated, at the same time preventing said shaft from moving longitudinally toward the flange 22. Further means, known and not illustrated, prevent the shaft 34 to translate in the direction opposite the former direction, so as to allow said shaft to rotate only.

With particular reference to FIGS. 1 and 2, the cylindrical body 26 is tied to the flange 22 by four studs 40 fixed at one end to the flange 22 by means of the screws 24 (with the interposition of a plate 39) and fixed at the other end, in a known manner not illustrated, by means of screws screwed on a closure member 41 of the cylindrical body 26.

On the part of portion 35 of the shaft 34 located between the flanges 16 and 22 is keyed a gear 42 which is permanently meshing with one of the two gears 19 described above, and particularly with the gear located downwardly in FIG. 1.

The rotary movements of the shaft 34, which are transmitted through the gears 42 and 19 to the shafts 5 and then to the jaws 4, are obtained as follows.

A block 43 is fixed on the end of piston 30, in particular on the end of the body bounding the longitudinal cavity 33. Said block is provided with an axial passage generally of cylindrical shape which permits its attachment (e.g. by screwing) to the threaded end of piston 30. As it can be seen in FIG. 1 and in particular in FIG. 2, the dimensions of block 43 are such that the block engages by its apexes with the studs 40, so that said studs prevent any rotary movement of the block 43 and provide a guide means for its longitudinal sliding jointly with piston 30.

In the block 43 there are provided two pins 44 introduced into two corresponding diametrically opposed cavities of block 43; said pins are locked with known means, not shown, to said cavities. Pins 44 protrude from block 43 beyond the internal surface forming the axial passage receiving shaft 34, and the protruding end of pins 44 pass through the wall of piston 30 and are received each in a corresponding shaped groove 45 provided on the shaft 34.

Each one of the two grooves 45, as can be seen particularly in FIG. 1, is formed on the shaft 34 according a generally helical profile from one end of said shaft to the other end. It is therefore clear that on actuation of piston 30 the engagement of the pins 44 in the groove 45 during their movement together with piston 30 will cause, owing to the shape of the grooves 45, the rotary movement of shaft 34 which cannot slide, as above described.

The rotary movement of shaft 34 caused by piston 30 is transmitted to the shafts 5 and then to the jaws 4 by means of the gears 42 and 19. The jaws 4 will therefore rotate in either direction according to the movement direction of piston 30, as is evident from FIG. 3. The jaws can therefore rotate in the direction of arrows F1, clamping therefore therebetween the crop-end 2, or conversely they can rotate in the direction of arrows F so as to free the crop-end 2 which will drop by gravity in the unloading zone. As it is disclosed in the Italian Patent Application No. 23472 A/82 filed on Sept. 28, 1982, the jaws 4 must also move in a direction perpendicular to the plane in which they rotate, so as to cause the crop-end 2 to go out the bar pusher 3. In this direction the jaws must move leftwards with reference to FIG. 1. Further, as it is disclosed in the above referenced patent application, the jaws must be allowed to move in the opposite direction as, after grasping the rear end of a new metal bar to be machined, they must control the insertion of said rear end in the bar pusher 3.

The two above described movements are allowed since, as hereinbefore pointed out, the shafts 5 supporting the jaws 4 are sliding in the support members 7 together with the sleeve members 6. In order to obtain these two movements the device according to the invention is comprised of control means as described hereinafter.

With particular reference to FIGS. 1 and 2, said control means include an actuating piston 46 having its longitudinal axis parallel to and underlying the axis of piston 30. The cylinder 47 of piston 46 is pivoted at 48 to the stationary frame 1 of the machine. The end of the stem 48 of piston 46 is tied, by means of a screw 49, to a block 50 lying transversely to the longitudinal axis of stem 48. The ends 51 of block 50 are pivotally fitted in the lower end of a pair of rods 52, one rod being broken away in the figure for sake of clarity.

As it is illustrated particularly in FIG. 2, rods 52 lay parallel each other and at their upper end are pivotally connected to the ends 53 of a block or spacer 54. Spacer 54 in turn is rigidly connected to the end of a rod or support bracket 55 which has its other end fastened by means of a lock screw 56 (see also FIG. 4) to support a bracket 57 which is fork-shaped and fastened to the stationary frame 1 by means of a lock screw 58.

Rods 52 in their middle portion are connected to flange 22 by means of a connecting rod 59 which connects a spacer 60 of the rods 52 with flange 22 by means of a lock screw 62. Spacer 60 is pivotally connected to rods 52 at its ends 61.

By virtue of the above described connection the sliding movements of stem 48 of piston 46 are transformed in corresponding sliding movements of the connecting rod 59, by means of spacer 54 acting as a fulcrum. All elements connected to rod 59 are therefore caused to shift along the same direction and therefore it will be obtained, because of the connection between flange 22 and flange 16 and sleeve members 6, the sliding movement of the sleeve members 6 inside the support members 7, and eventually the sliding movement of the jaws 4 connected to the shafts 5. Said jaws can therefore slide either toward the bar pusher 3 or in the opposite direction, either when the end of a new metal bar to be machined is to be conducted into the bar pusher 3 or when the crop-end 2 is to be drawn off the bar pusher, respectively.

With reference now to FIGS. 8 to 13 it will be disclosed a second embodiment of the device according to the invention. In this embodiment, the components of the device are the same as the first embodiment what only changes is the mutual arrangement of said copmonents. In fact, in the first embodiment, as it results particularly from FIG. 1, the shafts 5 and the members supporting said shafts, are placed superimposed one another in the vertical direction, and taking the position of the support flanges 16 and 22 as a reference, piston 25 is located at the side opposite to that of shafts 5 and jaws 4.

Figure 8:
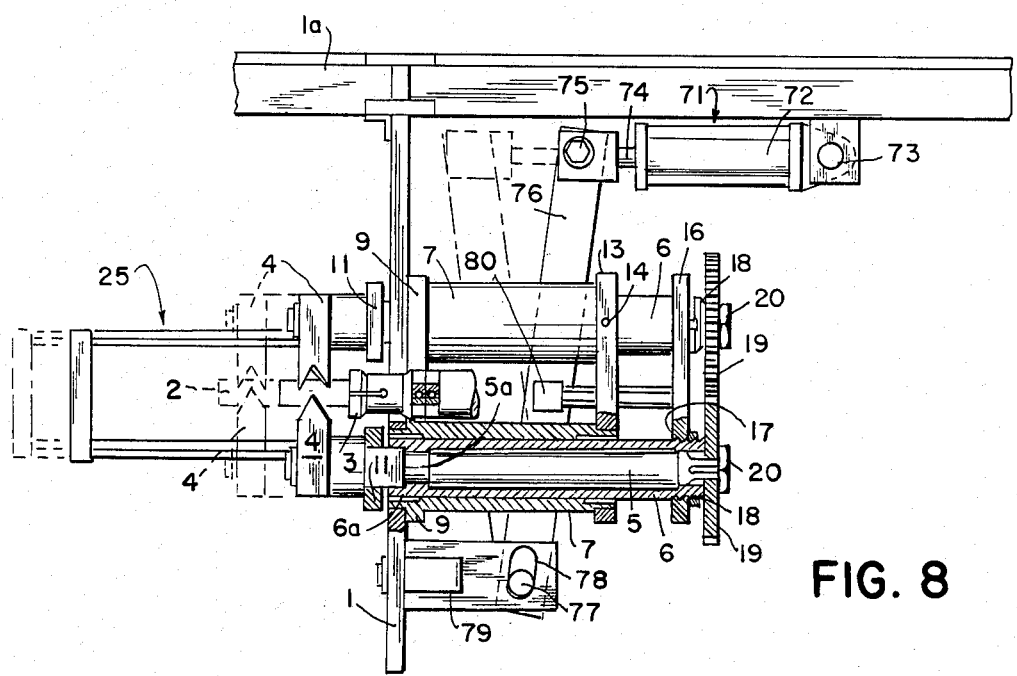
FIG. 8 is a plan view in the direction of arrow VIII of FIG. 11 of a second embodiment of the device according to the invention.
Figure 13:
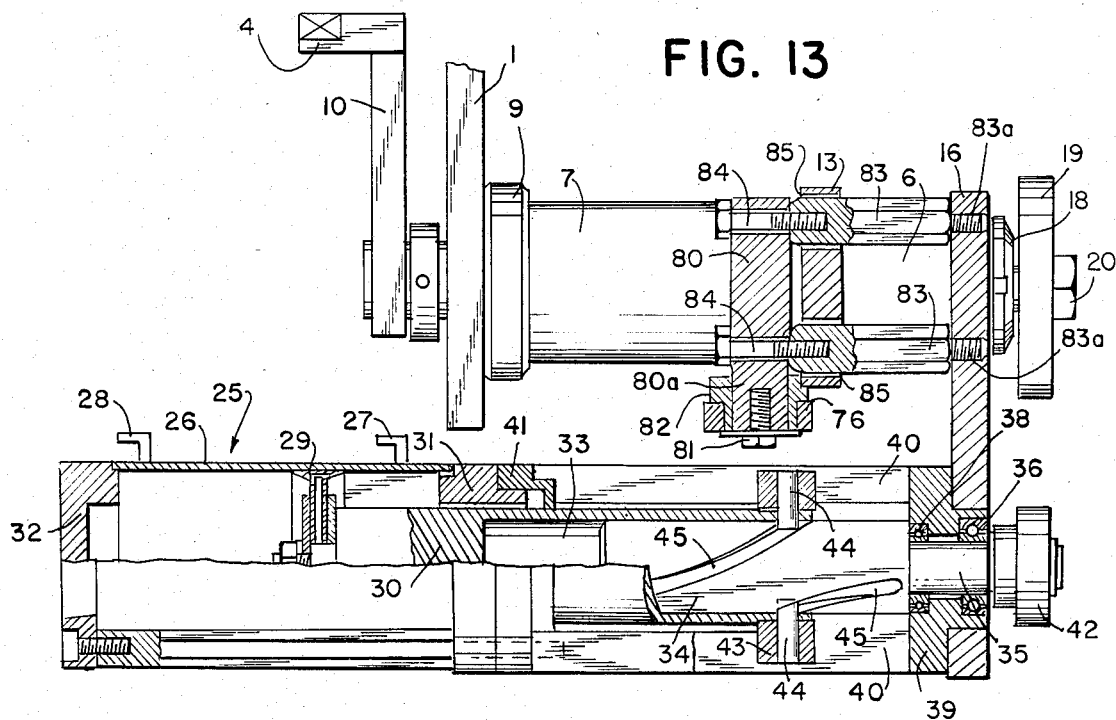
FIG. 13 is a sectional view of the device taken along the line XIII—XIII of FIG. 9.

In the second embodiment, as clearly shown in FIGS. 8 and 13, the shafts 5 are generally on the same plane which is slightly slanted with respect to a horizontal plane (see also FIG. 11), whereas piston 25 is on the same side of shafts 5 and jaws 4.

The slight inclination of the plane in which the shafts 5 lie, as seen more particularly in FIG. 11, is due inter alia to the fact that the jaws 4 must be prevented, during their opening and closing movements according to the directions of arrows F and F1 respectively, from striking the guide channels near the concerned channel from which the crop-end 2 is withdrawn.

In FIG. 11 the reference letter C designates generally three guide channels for the metal bars, said guide channels being held by a drum T in a guide apparatus which has for example eight stations, i.e. it includes eight guide channels circumferentially equally spaced. In this figure it is therefore seen that the jaws 4 should be placed, when in the condition of closing on the crop-end 2, with their longitudinal axis laying perpendicularly to the mean transverse axis B—B of that guide channel the crop-end 2 is being drawn out. Since during the operating condition said channel is sloping, i.e. its mean transverse axis B—B makes an angle with the vertical direction, as a consequence and as it is clear from FIG. 11, the plane in which the longitudinal axes of shafts 5, which plane is perpendicular to said mean axis B—B, will make an angle with a horizontal plane. Only if this condition is satisfied the jaws 4 during their opening (arrow F) and closing (arrow F1) movements will not strike the guide channels C near the concerned channel from which the crop-end 2 is being withdrawn.

The sloping arrangement as above described for the device of the invention is anyway an intrinsic characteristic of the guide channels of the apparatus for feeding metal bars to a lathe, and is out the object of the present invention.

For the description of the second embodiment of the device of the invention, as in the above introductory description, the parts which are the same as in the first embodiment are assigned like reference numerals, for sake of an easier understanding.

The reference numeral 1 designates the stationary frame on which the device of the invention is arranged, and the reference numeral 1a designates part of a longitudinal member supporting the frame 1.

As in the first embodiment, a pair of support members 7 are fastened to the stationary frame 1, and to this end said members are provided at one end with a peripheral flange 9 which permits the use of lock screws (not shown in this case) which are screwed in the stationary frame 1.

At the other end the support members 7 are mutually connected by a flange 13 which is locked to said members by means of lock screws 14. As shown particularly in FIG. 8 which is a partial sectional view, within each of the support members 7 it is slidingly movable in the longitudinal direction a sleeve member 6, and within said sleeve member a shaft 5 is freely rotatable. Longitudinal sliding movements of shafts 5 with respect to sleeve members 6 are prevented also in this case by means of an internal radial protrusion 6a of the sleeve member 6, said protrusion engaging a corresponding recess 5a provided on the shaft 5.

The sleeve members 6 are mutually connected at the opposite end of the stationary frame 1 by a flange 16 held against a step portion 17 of the sleeve members 6 by stop nuts 18. On the ends of the shafts 5 protruding out the sleeve members 6 there are fastened (as described for the first embodiment) two gears 19 which are permanently mutually meshing and held in position by nuts 20.

Figure 12:
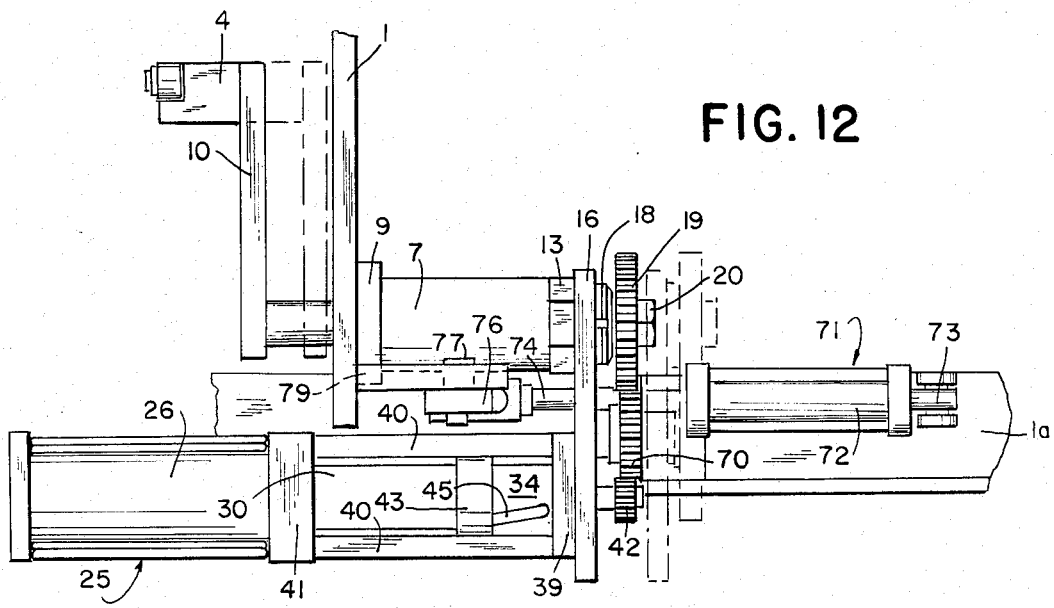
FIG. 12 is a view of the device in the direction of arrow XII of FIG. 11.

Rotary movements of gears 19 and therefore of jaws 4 are driven (as in the first embodiment) by a piston 25 identical to the piston of the first embodiment; said piston is shown particularly in FIGS. 10, 12 and 13. In these figures appear the same reference numerals used in the first embodiment, and therefore the description of this actuating piston is now omitted. A first difference, as it is clear from FIGS. 12 and 13, consists in the fact that piston 25 is now directly supported by flange 16 which is fastened to the sleeve members 6. A further difference, making again reference in particular to FIG. 12 and 13, consists in the fact that piston 25 is arranged directly under the above described assembly which carries the shafts 5, i.e. the piston, contrary to the first embodiment, has a position which is turned over 180° with respect to the position it occupies in the first embodiment.

On the protruding end of the portion 35 of the grooved shaft 34 of piston 25 there is fastened a drive gear 42 which (FIGS. 11 and 12) transmits the movement to one gear of the gears 19 through an interposed gear 70 supported freely rotatable by flange 16. The provision of an intermediate gear as gear 70 is due to the fact that a certain distance is thus provided between piston 25 and support members 7 due to the presence of a drive rod for the axial movements of sleeve member 6, which rod will now be described together with its actuating means.

The means which control the axial movements of the sleeve members 6 are comprised of a piston 71, the cylinder 72 of said piston being fastened in 73 to the longitudinal member 1a of the stationary frame. The stem 74 of piston 71 moves along an axis generally parallel to the axis of movement of the sleeve members 6, and the end of said stem is pivotally connected in 75 to a control rod 76 transversely occupying the distance between the assemblies supporting the shafts 5 and the cylinder 25. To the other end of rod 76 there is fastened a pin 77 which can rotate and shift within a slot aperture 78 provided in bracket 79 fastened by any known means to the stationary frame 1.

The control rod 76 is connected to the flange 16 as hereinafter described in order to transform the rotary movements of said rod in sliding movements of the flange 16 and then of the sleeve members 6 which are fixed thereto.

The the above end the rod 76 is pivotally connected in generally mean portion to a connecting rod 80 which extends vertically in the space between the two support members 7. The bottom end 80a of the connecting rod 80 is connected, by means of a screw 81 and an interposed sleeve 82, to the rod 76 (FIGS. 10 and 13). The connecting rod 80 is connected to the flange 16 by means of connecting crosspieces 83, one end 83a of said crosspieces being threaded and screwed on the flange 16, whereas in the other end there are screwed lock screws 84 passing through the connecting rod 80 and locking against said rod 80 the crosspieces 83. The latter crosspieces are slidably engaged within holes 85 provided in the flange 13 fixed to the support members 7.

The operation of the two embodiments of the device according to the invention can be easily understood from the above description of their structure. In the following there are however described the basic operation steps for sake of completeness.

As far as the first embodiment is concerned, in FIG. 1 the jaws 4 are shown in the closed condition, that is said jaws are clamping the crop-end 2, and therefore at this time the actuating piston 25 is nonoperative. It is then caused by means of the piston 46 a clockwise rotation of rods 52 which rods, by virtue of the connecting rod 59, transform their rotary movement in a sliding movement of flange 22 which transmits that movement to the flange 16 causing a consequent movement of the sleeve members 6 and then a movement of the shafts 5. The jaws 4 will therefore move from the position shown in solid lines to the position shown in dotted lines causing the crop-end 2 to get out the end of the bar pusher 3.

The operative piston 25 will now be actuated so as to open the jaws 4, that is causing a rotation of said jaws in the direction of arrows F in FIG. 3, dropping by gravity the crop-end 2.

As a new metal bar to be machined by the lathe will be positioned, the operative piston 25 will be actuated in the opposite direction so as to cause the jaws to return in the former position, with the jaws clamping the rear and of the new metal bar, generally in the position of the crop-end 2 just before dropping. At this point of the sequence, by means of piston 46 it will be caused a counterclockwise rotation of the rods 52, so as to move back the control shafts 5 to the former position, i.e. the position illustrated by solid lines in FIG. 1, in which position the jaws 4 can introduce the rear end of the metal bar into the end of the bar pusher 3. In this condition the crop-end 2 shown in FIG. 1 can be considered a counterpart of the rear end of the new metal bar to be machined. The operative sequence will then repeat identically.

As far as the second embodiment is concerned, in FIG. 8 the jaws 4 are represented by solid lines in the closed condition, i.e. the condition in which said jaws are clamping a crop-end 2 to be drawn out. It will now be necessary only to cause a counterclockwise rotation of the control rod 76 up to the position shown by dotted lines in the same figure, so as to bring the jaws 4 to the position shown by dotted line in FIG. 8, because of the sliding movement of the flange 16 and the sleeve members fixed thereto. The same condition of the device is illustrated by solid lines in FIG. 9. In this condition, it is sufficient to cause the actuation of the operative piston 25 so as to cause a rotary movement of the jaws 4 to open the jaws according the direction of arrows F, so as to drop the crop-end by gravity in the unloading area.

At this point of the sequence, by means of movements in the opposite direction, i.e. rotary movement such as to close the jaws 4 and move backwards said jaws from the position shown with solid lines in FIG. 9, it will be obtained the introduction of a new metal bar to be machined into the end 3 of the bar pusher.

According to one of the main features of the device of this invention, the operative piston 25 acts as a matter of fact as a cylindrical grooved cam, for which the cam follower is the grooved shaft 34 by which the sliding movements of piston 30 are transformed into rotary movements of the jaws 4.

A further main feature of the device of the invention is that the dimensions of the device are pratically comprised of the longitudinal dimensions only, and the device does not include transverse members, contrary to the device of the above cited patent application. In this way the total dimensions of the device are uniquely reduced, and the device can be used with equipments of any dimension, even of very small dimensions. Due to this particular advantage, the device can be considered as an universal one, i.e. suitable for use without requiring any change.

It is also clear that changes can be made in the device according to the present invention without departing from the object of the invention.

We claim:

1. A device for use with an equipment for feeding metal bars to a multi-spindle lathe, suitable for drawing the crop-end of said bars out a bar pusher and unloading said crop-end in a unloading area, and suitable also for introducing one end of said metal bars into said bar pusher, comprising a pair of jaws rotatable for clamping and unclamping said crop-end and sliding longitudinally along the feeding axis of said bars, each jaw being supported by an associated rotary shaft contained within a sleeve member, each sleeve member being slidably contained within an associated support member fixed to a stationary frame, said shafts being connected to means for causing the rotary movements of said shafts, and said sleeve members being connected to means for causing the sliding movements of said sleeve members, characterized in that said means causing the rotary movements of said shafts (5) include at least one operative piston (25) suitable for transforming the sliding movements of a member movable along an axis generally parallel to the axis along which said sleeve members (6) are moving into rotary movements of a further member kinematically connected to said shaft (5).

2. A device according to claim 1, characterized in that said operative piston (25) is generally comprised of a grooved cylindrical cam assembly in which the cam follower is a shaft (34), a gear (42) being fastened to the end of said shaft (34), said gear (42) meshing with one gear of a pair of gears (19) fastened to said shafts (5).

3. A device according to claim 1, characterized in that said operative piston (25) is comprised of a cylinder (26) fastened to a flange fixed to said sleeve members (6), a stem (30) sliding within said cylinder (26) being provided, prevalently in its portion protruding out said cylinder (26), with a longitudinal extending cavity (33), a grooved shaft (34) being rotatable within said cavity (33), said grooved shaft (34) engaging with pins (44) provided on one end of said stem (30).

4. A device according to claim 3, characterized in that a block (43) is fastened outwardly on one end of stem (30) of the operative piston (25), said block (43) being provided with radial passageways, at least a pair of said pins (44) being positioned inside said radial passageways, said pins (44) being positioned diametrically opposed and protruding internally in said cavity (33) of said stem (30), the ends of said pins (44) engaging with grooves (45) of generally helical configuration which are provided on said shaft (34) placed within said cavity (33) of said stem (30).

5. A device according to claim 4, characterized in that said block (43) is slidingly guided by means of studs (40) provided around said stem (30) and connecting the end of said cylinder (26) with a flange fastened to said sleeve members (6).

6. A device according to claim 1, characterized in that one end portion (35) of said shaft (34) is of a reduced diameter and is supported at the end by a vertically extending flange (16) fastened to said sleeve members (6) and also supported by a further flange (22) fastened and parallel to said flange (16), said gear (42) being fastened to said portion (35) and meshing with one gear of the pair of gears (19) fastened to said shafts (5) carrying said jaws (4).

7. A device according to claim 6, characterized in that said operative piston (25) is fastened perpendicularly to said vertically extending flange (22) on the side opposed to the side where said jaws (4) are provided.

8. A device according to claim 1, characterized in that said means for causing the sliding movements of said sleeve members (6) comprises at least one control rod (52) pivotally connected at one end to said stationary frame (1) and at the other end to the stem (48) of a control piston (46), said control rod (52) being connected in an intermediate portion thereof to said flange (22) fastened to said sleeve members (6) by means of a connecting rod (59).

9. A device according to claim 8, characterized in that said rod (52) is positioned in respect to said flange (22) at the same side of said operative piston (25).

10. A device according to claim 1, characterized in that said support members (7) within which said sleeve members (6) slide are generally superposed each other.

11. A device according to claim 1, characterized in that said support members (7), within which said sleeve members (6) slide, are positioned in a generally horizontal plane and said operative piston (25) is fixed on the same side of said support members (7) to a vertically extending flange (16) fastened to said sleeve members (6).

12. A device according to claim 1, characterized in that said means for causing said sliding movements of said sleeve members (6) comprises at least one control rod (76) pivotally connected at one end to said stationary frame (1) and at the other end to a control piston (71), said control rod (76) transversely occupying the distance between said support members (7) and said operative piston (25).

13. A device according to claim 12, characterized in that an intermediate portion of said control rod (76) is connected to a connecting rod (80) extending between said two support members (7) which support said sleeve members (6), said connecting rod (80) being connected by means of connecting crosspieces (83) to said flange (16) fastened to said sleeve members (6).

14. A device according to claim 1, characterized in that said jaws (4) are fastened to said support shafts (5) by means of a clamp member (11) embracing the end portions of said shafts (5) and clamped thereon by means of at least one lock screw (12).

* * * * *